Patented Nov. 15, 1932

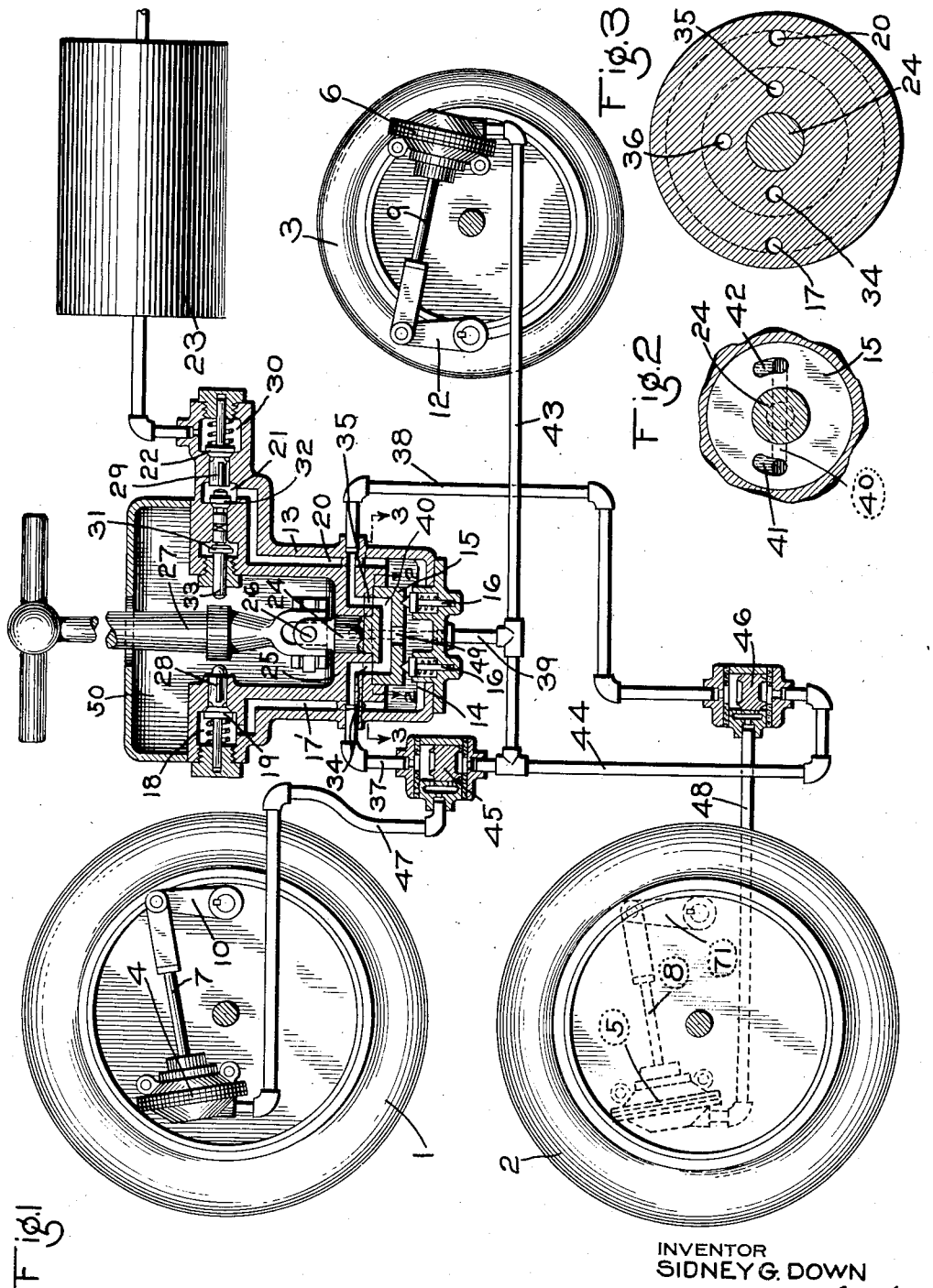

1,887,585

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AIRPLANE BRAKE

Application filed February 19, 1930. Serial No. 429,610.

This invention relates to brakes, and more particularly to a brake device for an airplane.

Airplanes are usually equipped with two front and one rear landing wheels and in my prior pending application, Serial No. 319,137, filed November 13, 1928, is disclosed a brake equipment for controlling brakes associated with the front and rear landing wheels by fluid under pressure.

In order to control the airplane while running along the ground, it is desirable that the pilot should be able to independently control the braking of either front wheel or to simultaneously control the brakes on both the front and rear wheels.

In starting an airplane, the motor is speeded up before starting and there is a tendency for the tail of the airplane to rise and lift the rear landing wheel off the ground. In such event, it is desirable to have the brakes applied at the front wheels to prevent the airplane from moving along the ground, until the motor has attained a desired speed.

The principal object of my invention is to provide a fluid pressure airplane brake apparatus in which the brake may be applied simultaneously at both the front and rear landing wheels, at either front wheel without applying the brake at the other wheels, and simultaneously at both front wheels, without applying the brake at the rear wheel.

In the accompanying drawing: Fig. 1 is a diagrammatic view of an airplane fluid pressure brake equipment embodying my invention; Fig. 2 a section on the line 2—2 of Fig. 1; and Fig. 3 a section on the line 3—3 of Fig. 1.

As shown in Fig. 1 of the drawing, the wheels 1 and 2 represent the front landing wheels of an airplane and the wheel 3, the rear landing wheel. Associated with the wheels 1, 2 and 3 respectively, are brake chambers 4, 5 and 6 having rods 7, 8 and 9 connected respectively to arms 10, 11 and 12, each arm being operatively connected to the usual cam (not shown) by which a brake band (not shown) is actuated to frictionally engage a brake drum (not shown) of the usual well known construction. Thus when fluid under pressure is supplied to a brake chamber, the brakes are applied on the corresponding wheel.

For controlling the admission and release of fluid under pressure to and from the brake chambers, a controlling valve device is provided, comprising a casing 13 having a valve chamber 14 containing a rotary valve 15, which is yieldingly held to its seat by spring-pressed pins 16.

A passage 17' leads from valve chamber 14 to a valve chamber 18 containing an exhaust valve 19 and a passage 20 leads from valve chamber 14 to a chamber 21. A fluid pressure supply valve 22 contained in valve chamber 30 controls communication from valve chamber 30 to chamber 21. The valve chamber 30 is connected to a source of fluid under pressure, such as the storage reservoir 23.

The valve 15 has a stem 24 which extends upwardly through a bore in a partition wall 25 and is connected through a universal joint 26 with an operating rod 27. The rod 27 is adapted, when rocked at its universal joint toward the left, to engage the stem 28 of the exhaust valve 19. In alinement with the stem 29 of the supply valve 22 are double beat valves 31 and 32, the valve 31 having a stem 33 adapted to be engaged by the rod 27, when said rod is rocked toward the right.

In normal position, as shown in the drawing, the seating of valve 32 prevents escape of fluid from chamber 14 past the stem 33, while the seating of valve 31, when the supply valve 22 is operated by the movement of stem 33 to the right, through the rocking of the rod 27, prevents leakage of fluid past the stem 33.

The seat of the rotary valve 15 is provided with three ports 34, 35 and 36, leading respectively to pipes 37, 38 and 39, and the rotary valve 15 is provided with a cavity 40 having elongated ports 41 and 42 at the face of the valve.

The pipe 39 is connected to a pipe 43, leading to the brake chamber 6 and to a pipe 44 which leads to one side of two double check valves 45 and 46. The double check valve 45 controls communication from pipes 37 and 44 to pipe 47, leading to brake chamber 4, and double check valve 46 controls communication from pipes 38 and 44 to pipe 48, leading to brake chamber 5. The cavity 40 in rotary valve 15 has an opening 49 to chamber 14.

In operation, the rotary valve 15 is rotated by operation of the rod 27 to establish communication to the brake chambers at which it may be desired to apply the brakes. If the valve 15 is rotated to the position shown in Fig. 1, ports 34 and 35 will register with ports 41 and 42 in the valve 15, while the port 36 is blanked. To apply the brakes, the rod 27 is rocked toward the right, so that the stem 33 is shifted outwardly and the supply valve 22 is thereby unseated. Fluid under pressure is then supplied from valve chamber 30 and the reservoir 23, through passage 20 to chamber 14, and from chamber 14, fluid flows through port 49 to cavity 40 in rotary valve 15, and thence to pipes 37 and 38. The double check valves 45 and 46 are then shifted by fluid under pressure, supplied to pipes 37 and 38, to the positions shown in the drawing, so that fluid under pressure is supplied past the double check valves to pipes 47 and 48 and consequently to the brake chambers 4 and 5. The brakes are thus simultaneously applied at the front landing wheels 1 and 2, without applying the brake at the rear landing wheel 3.

When the desired fluid pressure is obtained, the rod 27 is moved back, so as to permit the supply valve 22 to seat and cut off the further flow of fluid under pressure to the brake chambers. The brakes may be released by rocking the rod 27 toward the left so as to actuate the stem 28 and unseat the exhaust valve 19. Fluid under pressure is then released from chamber 14 and the brake chambers 4 and 5, through passage 17' and past the open valve 19 to chamber 50 in the casing 13, which is open to the atmosphere.

If it is desired to control the brake only at the landing wheel 1, the valve 15 is rotated in a counter-clockwise direction from the position shown in Fig. 2, so that port 42 is moved out of registry with port 35, while port 41 remains in registry with port 34, due to its elongation. It will now be evident that when the rod 27 is operated to apply and release the brakes, only the brake at the front wheel 1 will be operated.

If it is desired to control the brake at only the front wheel 2, the valve 15 is rotated in a clockwise direction from the position shown in Fig. 2, so that port 41 is moved out of registry with port 34, while port 42 remains in registry with port 35.

If it is desired control the brakes simultaneously at the rear wheel 3 as well as the front wheels 1 and 2, the valve 15 is rotated so that either the port 41 or 42 registers with port 36, while the ports 34 and 35 are blanked.

In this position, when the rod 27 is operated to open the supply valve 22, fluid under pressure is supplied from chamber 14, through cavity 40 to port 36 and thence to pipe 39. From pipe 39, fluid flows through pipe 43 to brake chamber 6 to apply the brake at the rear landing wheel 3, and also through pipe 44 to the double check valves 45 and 46. The double check valves are then shifted to their opposite seats, so that communication is established from pipe 44 to the respective pipes 47 and 48, thus permitting the flow of fluid to the brake chambers 4 and 5.

It will be evident from the foregoing that the operator may selectively control the brakes as desired, either simultaneously at both the front and rear landing wheels, simultaneously at both front wheels, or at either front wheel.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake apparatus for an airplane, the combination with brake chambers at the front landing wheels and the rear landing wheel, admission of fluid under pressure to which operates to apply the brakes, of valve means for controlling the supply of fluid under pressure to said brake chambers, valve means for controlling communication through which fluid under pressure is supplied to said brake chambers and having one position in which fluid under pressure is simultaneously supplied to both the front wheel brake chambers and to the rear wheel brake chamber, and another position in which fluid under pressure is supplied only to the front wheel brake chambers, a pipe through which fluid under pressure is simultaneously supplied to all brake chambers, and double check valves for controlling communication from said pipe to the front wheel brake chambers.

2. In a fluid pressure brake apparatus for an airplane, the combination with brake chambers at the front landing wheels and the rear landing wheel, admission of fluid under pressure to which operates to apply the brakes, of valve means for controlling the supply of fluid under pressure to said brake chambers, valve means for controlling communication through which fluid under pressure is supplied to said brake chambers and having one position in which fluid under pressure is simultaneously supplied to both the front wheel brake chambers and to the rear wheel brake chamber, and another position in which fluid under pressure is supplied only to the front wheel brake chambers, a pipe through which fluid under pressure is simultaneously supplied to all three brake chambers, pipes through which fluid under pressure is supplied only to the front wheel brake chambers, and double check valves for controlling communication from the simultaneous supply pipe and from the front wheel supply pipes to the front wheel brake chambers.

3. In a fluid pressure brake apparatus for an airplane, the combination with brake chambers at the front landing wheels and the rear landing wheel, admission of fluid under pressure to which operates to apply the brakes, of valve means for controlling the supply of fluid under pressure to said brake chambers, valve means for controlling communication through which fluid under pressure is supplied to said brake chambers and having one position in which fluid under pressure is simultaneously supplied to both the front wheel brake chambers and to the rear wheel brake chamber, and another position in which fluid under pressure is supplied only to the front wheel brake chambers, a pipe through which fluid under pressure is simultaneously supplied to all three brake chambers, pipes through which fluid under pressure is supplied only to the front wheel brake chambers, and double check valves operated by fluid pressure supplied to the front wheel supply pipes for cutting off communication from the simultaneous supply pipe to the front wheel brake chambers.

4. In a fluid pressure brake apparatus for an airplane, the combination with brake chambers at the front landing wheels and the rear landing wheel, admission of fluid under pressure to which operates to apply the brakes, of valve means for controlling the supply of fluid under pressure to said brake chambers, valve means for controlling communication through which fluid under pressure is supplied to said brake chambers and having one position in which fluid under pressure is simultaneously supplied to both the front wheel brake chambers and to the rear wheel brake chamber, and another position in which fluid under pressure is supplied only to the front wheel brake chambers, a pipe through which fluid under pressure is simultaneously supplied to all three brake chambers, pipes through which fluid under pressure is supplied only to the front wheel brake chambers, and double check valves for controlling communication through which fluid under pressure is supplied to the front wheel brake chambers, and operated by fluid under pressure supplied to the pipe for simultaneously supplying fluid to all three brake chambers for cutting off communication from the front wheel brake chamber supply pipes to the front wheel brake chambers.

In testimony whereof I have hereunto set my hand, this 13th day of February, 1930.

SIDNEY G. DOWN.